No. 764,936. PATENTED JULY 12, 1904.
H. G. FITLER.
PNEUMATIC TIRE.
APPLICATION FILED NOV. 28, 1903.
NO MODEL. 2 SHEETS—SHEET 1.

WITNESSES: INVENTOR
Maude Zwisler. Harry G. Fitler,
G. W. Austin BY C. E. Humphrey
ATTORNEY No. 764,936. Patented July 12, 1904.

UNITED STATES PATENT OFFICE.

HARRY G. FITLER, OF PHILADELPHIA, PENNSYLVANIA, ASSIGNOR TO THE GOODYEAR TIRE & RUBBER COMPANY, OF AKRON, OHIO.

PNEUMATIC TIRE.

SPECIFICATION forming part of Letters Patent No. 764,936, dated July 12, 1904.

Application filed November 28, 1903. Serial No. 182,963. (No model.)

*To all whom it may concern:*

Be it known that I, HARRY G. FITLER, a citizen of the United States, residing at Philadelphia, in the county of Philadelphia and State of Pennsylvania, have invented a certain new and useful Improvement in Pneumatic Rubber Tires, of which the following is a complete specification.

This invention has a general relation to pneumatic tires and the means of fastening them to the wheel-rim.

The objects of my invention are to provide a novel pneumatic tire and means for attaching it to a vehicle-wheel rim.

To the accomplishment of the aforesaid objects my invention consists in the peculiar and novel construction, arrangement, and combination of parts hereinafter described, reference being had to the accompanying drawings, forming a part hereof.

Figure 1:
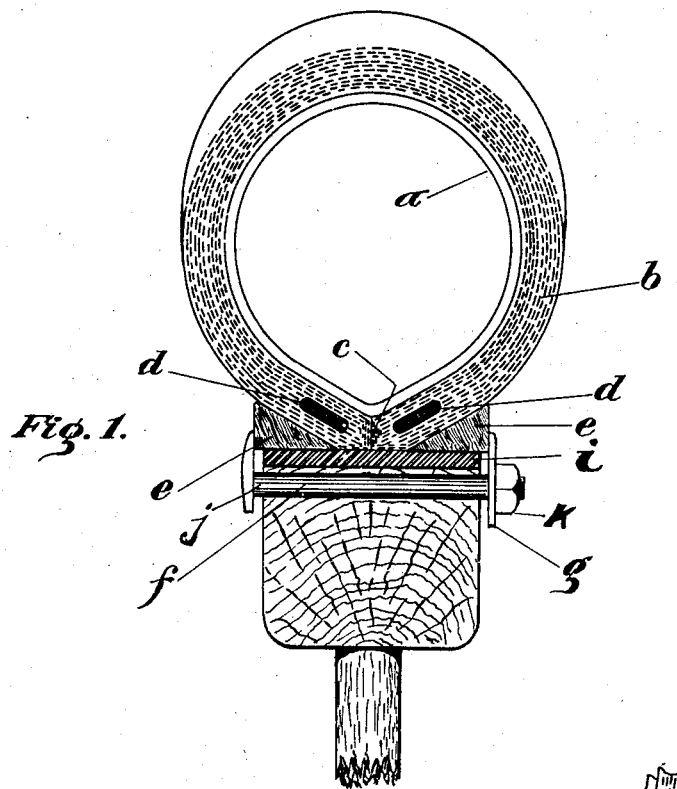
Figure 2:
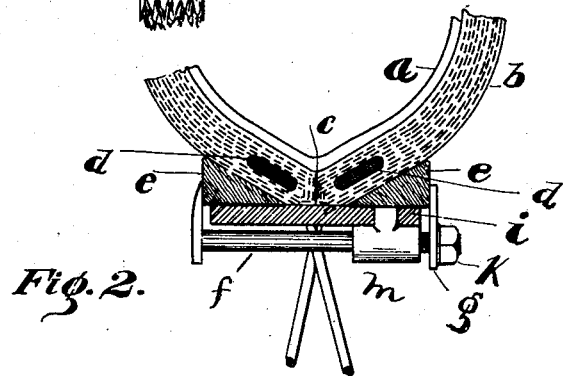

In the drawings, Figure 1 represents a cross-sectional view of my improved tire, together with the means whereby it is attached to a wheel-rim; Fig. 2, a similar view in which the wheel-rim is a metallic band without a supporting-felly, and Fig. 3 a side elevation of my device.

In the drawings, $a$ is the inner tube, which is inclosed by an outer tube or casing $b$, arranged to sustain the inner tube $a$ and unite at the point $c$. This outer tube $b$ is made up of successive layers of rubber and fabric until a desired thickness is obtained. The general construction of this outer tube, however, is immaterial to the scope of this invention.

Embedded in the outer tube $b$ near the inner edges are bands $d$, made up of woven-wire fabric, the ends whereof are spliced or united in any preferred form. This outer tube is arranged to seat on the iron tire $i$ of the wheel.

Figure 3:
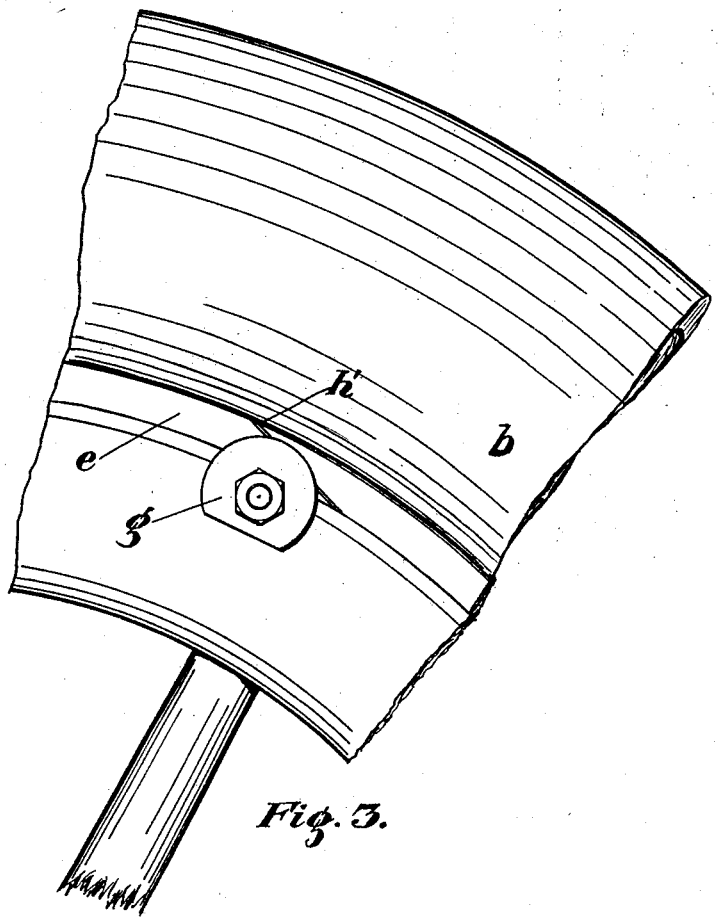

On either side of the outer tube $b$ and between it and the iron tire $i$ are placed pieces $e\ e$, made of any suitable material and preferably annular; but these pieces $e\ e$ may be made in straight lines and their ends cut diagonally in such configuration as to lap, as shown in Fig. 3 and indicated by the reference-letter $h'$. In order to draw these two wedge-shaped pieces or rings inward toward one another, and thereby form a seat for the tire, a suitable number of cross-bolts $f$ are passed through the felly of the wheel at intervals, the heads $j$ of which are of such diameter as to encounter one of the rings $e$, and on these bolts at the opposite side are placed washers $g$ of such diameter as to encounter and press against the opposite ring $e$ when forced inward by the rotation of the nuts $k$, placed on the ends of the bolts $f$. It will be obvious that the rotation of the nuts $k$ will force inward the wedge-shaped rings $e$ against the lower sides of the tire $b$, thereby forming a perfect seat therefor.

In the form shown in Fig. 2 no wooden felly is shown for the reception of the cross-bolts $f$; but the iron tire $i$ has depending from it a stationary sleeve $m$, through which the bolts $f$ pass, and the operation of this form of tire is the same as that just described.

What I claim, and desire to secure by Letters Patent, is—

1. The combination with an inner tube, of an inclosing outer tube provided at determinate points with constricting-bands in the body portion thereof arranged to contract said outer tube about a tire-rim, of wedge-shaped rings adapted to bear against the under side of said outer tube and the iron tire on which said outer tube seats, and mechanism to compress said wedge-shaped rings toward each other and against said outer tube.

2. The combination of a tire consisting of an inner and an outer tube said outer tube having in its inner edges inextensible bands or wires, of wedge-shaped pieces to enter the space between said outer tube and the tire on which said outer tube is to seat and means to press said wedge-shaped pieces toward each other.

3. The combination of an inner tube, an outer tube to surround said inner tube and constricting-bands in the shell of said outer tube arranged to compress said outer tube upon a normally flat tire, wedge-shaped pieces to fill the angle formed by the junction between said outer tube and the tire on which it seats and means to force said wedge-shaped pieces toward one another.

4. The combination with an inner tube and an outer inclosing case therefor, of inextensible bands mounted in the shell thereof arranged when drawn taut to seat said outer casing on the tire of an ordinary vehicle-wheel, of wedge-shaped rings to fill the space or angle between said outer casing and said tire and means to compress said wedge-shaped rings toward one another.

5. The combination with an inner tube and an outer tube arranged to inclose said inner tube, constricting-bands mounted in the inner edges of said outer tube arranged to cause said outer tube to seat on the outer periphery of the tire of a vehicle-wheel, wedge-shaped rings to fill the opening or angle between said outer casing and said tire, bolts passing through the felly of said wheel provided with heads adapted to engage one of said wedge-shaped rings, and washers on the end of said bolt to press on the other wedge-shaped ring, and means to cause the simultaneous movement of said heads and washers toward one another, substantially as shown and described.

In testimony that I claim the above I hereunto set my hand in the presence of two subscribing witnesses.

HARRY G. FITLER.

In presence of—
M. E. BAINBRIDGE,
EMPSON H. BAINBRIDGE.